(12) United States Patent
Müller et al.

(10) Patent No.: US 6,805,851 B1
(45) Date of Patent: Oct. 19, 2004

(54) METHOD FOR PRODUCING CRYSTALLINE, ZEOLITIC SOLID MATTER

(75) Inventors: Ulrich Müller, Neustadt (DE); Friedrich Hill, Meckenheim (DE); Norbert Rieber, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 58 days.

(21) Appl. No.: 10/049,907

(22) PCT Filed: Aug. 8, 2000

(86) PCT No.: PCT/EP00/07704

§ 371 (c)(1),
(2), (4) Date: Feb. 20, 2002

(87) PCT Pub. No.: WO01/14251

PCT Pub. Date: Mar. 1, 2001

(30) Foreign Application Priority Data

Aug. 20, 1999 (DE) ........................ 199 39 416

(51) Int. Cl.[7] ............................. C01B 37/04
(52) U.S. Cl. .................. 423/705; 423/716; 423/717; 502/60; 502/242
(58) Field of Search ................. 423/705, 716, 423/717; 502/60, 242

(56) References Cited

U.S. PATENT DOCUMENTS

| | | | |
|---|---|---|---|
| 3,329,481 A | | 7/1967 | Young |
| 3,838,192 A | | 9/1974 | Bertorelli et al. |
| 4,410,501 A | | 10/1983 | Taramasso et al. |
| 4,666,692 A | | 5/1987 | Taramasso et al. |
| 5,082,641 A | | 1/1992 | Popa et al. |
| 5,378,671 A | | 1/1995 | Keville et al. |
| 5,430,000 A | | 7/1995 | Timken |
| 5,558,851 A | | 9/1996 | Miller |
| 5,624,658 A | * | 4/1997 | Fitoussi et al. ............. 423/702 |
| 5,637,287 A | * | 6/1997 | Vaughan et al. ............. 423/702 |
| 5,859,265 A | | 1/1999 | Mueller et al. |
| 5,919,430 A | * | 7/1999 | Hasenzahl et al. ........... 423/702 |
| 6,008,389 A | | 12/1999 | Grosch et al. |
| 6,106,803 A | | 8/2000 | Hasenzahl et al. |
| 6,235,258 B1 | | 5/2001 | Mueller et al. |
| 2001/0002991 A1 | * | 6/2001 | Botti et al. ................. 423/707 |
| 2001/0008868 A1 | * | 7/2001 | Carati et al. ................. 502/64 |

FOREIGN PATENT DOCUMENTS

| | | |
|---|---|---|
| BE | 1 001 038 | 6/1989 |
| DE | 30 47 798 | 10/1981 |
| DE | 44 25 672 | 1/1996 |
| DE | 196 23 609 | 12/1997 |
| DE | 197 32 865 | 2/1999 |
| EP | 0 100 118 | 2/1984 |
| EP | 0 100 119 | 2/1984 |
| EP | 0 200 260 | 12/1986 |
| EP | 0 208 311 | 1/1987 |
| EP | 0 266 825 | 5/1988 |
| EP | 0 267 362 | 5/1988 |
| EP | 0 292 363 | 11/1988 |
| EP | 0 311 983 | 4/1989 |
| EP | 0 376 453 | 7/1990 |
| EP | 0 405 978 | 1/1991 |
| EP | 0 893 158 | 1/1999 |
| GB | 2 116 974 | 10/1983 |
| JP | 04-016509 | 1/1992 |
| WO | WO 94/29408 | 12/1994 |

OTHER PUBLICATIONS

Patent Abstract of Japan, JP 4–016509, Jan. 21, 1992.
Chemical Abstracts, DE 31 41 283, Apr. 28, 1983.
Chemical Abstracts, DE 196 23 611, Dec. 18, 1997.
Chemical Abstracts, DE 197 23 751, Dec. 10, 1998.
Chemical Abstracts, DE 197 54 924, Jun. 17, 1999.
Chemical Abstracts, DE 198 15 879, Oct. 14, 1999.
Chemical Abstracts, DE 198 39 792, Mar. 2, 2000.
Chemical Abstracts, DE 198 47 630, Apr. 20, 2000.
Chemical Abstracts, RU 20 16 845, Jul. 30, 1994.
Chemical Abstracts, RU 20 52 381, Jan. 20, 1996.
P. Behrens, et al., J. Chem. So., Chem. Commun., pp. 678–680, A Xanes and Exafs Investigation of Titanium Silicalite, 1991.
W. M. Meier, et al., Zeolites, 4th Edition, vol. 17, pp. 9–229, "Atlas of Zeolite Structure Types", 1996.

* cited by examiner

*Primary Examiner*—David Sample
(74) *Attorney, Agent, or Firm*—Oblon, Spivak, McClelland, Maier & Neustadt, P.C.

(57) ABSTRACT

Process for the preparation of a crystalline solid comprising at least one zeolitic material, in which the solid is crystallized from at least one precursor compound and the reaction discharge of the crystallization is fed directly to a drying stage.

5 Claims, No Drawings

METHOD FOR PRODUCING CRYSTALLINE, ZEOLITIC SOLID MATTER

The present invention relates to an improved process for the preparation of a crystalline solid, comprising at least one zeolitic material, the reaction discharge from the crystallization being fed, directly and without removal of any components, to a continuous drying, the solid per se prepared in this manner and its use as a catalyst, as support material for catalysts, as a sorbent, as a pigment or as a filler for plastics, in particular for the preparation of epoxides from olefins, and in turn the preparation of propylene oxide starting from propene with the use of a hydroperoxide, in particular $H_2O_2$.

Zeolites are known to be crystalline aluminosilicates having ordered channel and cage structures whose pore openings are in the range of micropores smaller than 0.9 nm. The network of such zeolites is composed of $SiO_4$- and $AlO_4$-tetrahedra which are linked via common oxygen bridges. An overview of the known structures is to be found, for example, in M. W. Meier, D. H. Olson, Ch. Baerlocher, "Atlas of Zeolite Structure Types", 4th Edition, Elsevier, London 1996, pages 9 to 229.

Exchangeable cations are present in zeolites in order to compensate the negative electrovalency produced by the incorporation of Al(III) into the Si(IV) silicate lattice; in particular, said cations may be cations of sodium, of potassium, of lithium or of cesium, depending on the preparation process. If these cations are exchanged for protons, for example by an ion exchange, the correspondingly acidic solids having a zeolite structure, i.e. the H-form, are obtained.

Zeolites which contain no aluminum and in which some of the Si(IV) has been replaced by titanium as Ti(IV) in the silicate lattice are also known. These titanium zeolites, in particular those having a crystal structure of the MFI type, and possibilities for their preparation are described, for example, in EP-A 0 311 983 or EP-A 405 978. In addition to silicon and titanium, such materials may also contain additional elements, such as, for example, aluminum, zirconium, tin, iron, cobalt, nickel, gallium, boron or small amounts of fluorine. In the zeolite catalysts used in the novel process, some or all of the titanium of the zeolite may be replaced by vanadium, zirconium, chromium or niobium or a mixture of two or more thereof. The molar ratio of titanium and/or vanadium, zirconium, chromium or niobium to the sum of silicon and titanium and/or vanadium and/or zirconium and/or chromium and/or niobium is as a rule from 0.01:1 to 0.1:1.

It is known that titanium zeolites can be identified from a specific pattern in the determination of the X-ray diffraction diagrams and additionally from a skeletal vibration band in the infrared range at about 960 cm−1 and can thus be distinguished from alkali metal titanates or crystalline or amorphous $TiO_2$ phases.

It is known that titanium zeolites having the MFI structure are suitable as catalysts for oxidation reactions. Thus, for example, EP-A 0 100 118 and EP-A 0 100 119 disclose a process in which propene can be epoxidized in the aqueous phase with hydrogen peroxide over titanium zeolites to give propylene oxide. The preparation of cyclohexanone oxime from cyclohexanone by reaction with ammonia and hydrogen peroxide is described in EP-A 0 208 311. Further reactions used in such catalysts, such as the hydroxylation of aromatics and the oxidation of saturated C2- to C18- hydrocarbons with $H_2O_2$ are disclosed in GB-A 2 116 974 and EP-A 0 376 453, respectively.

Typically, the abovementioned titanium zeolites are prepared by reacting an aqueous mixture of an $SiO_2$ source, a titanium oxide and a nitrogen-containing organic base, such as, for example, tetrapropylammonium hydroxide, in the presence or absence of an alkali solution in a pressure-resistant container at elevated temperatures for several hours or a few days, a crystalline product being obtained. This is as a rule filtered off, washed and dried and calcined at elevated temperatures to remove the nitrogen-containing organic phase. In the powder thus obtained, at least some of the titanium is present within the zeolite framework in varying proportions with four-, five- or six-fold coordination (Behrens et al., J. Chem. Soc., Chem. Commun. (1991) 678–680). In order to improve the catalytic behavior, this may be followed by repeated treatment by washing with a solution of hydrogen peroxide in sulfuric acid, after which the titanium zeolite powder has to be dried and calcined again, as described, for example, in EP-A 0 276 362. The titanium zeolite powder thus obtained must finally be processed with addition of suitable binders in a shaping step in order to make it available as a catalyst in a form capable of being handled. One method for this purpose is described in EP-A 0 200 260.

The above-described crystallization of the titanium zeolite from suitable starting materials by hydrothermal reaction is generally carried out at from 50 to 250° C. over a sufficiently long period, an autogenous pressure being established as a function of the temperature.

After the crystallization, there is the problem of separating the desired crystalline solid, having particle sizes of, as a rule, substantially less than 1 μm, from the strongly alkaline mother liquor still containing organic template. For this purpose, EP-A 0 893 158 describes, in the examples, either the separation by conventional centrifuging and subsequent washing of the solid or the addition of flocculants with subsequent centrifuging. According to this publication, the subsequent drying is carried out by spray-drying or drying by means of fluidized-bed spray granulation. Both the separation of the zeolite from the suspension obtained in the crystallization and the addition of flocculants constitute an additional process step which is time-consuming and expensive.

It is an object of the present invention to provide a process for the preparation of a crystalline solid comprising at least one zeolitic material, which process does not have the abovementioned disadvantages and in particular manages without additional intermediate steps between crystallization and drying.

We have found that this object is achieved by a process for the preparation of a crystalline solid comprising at least one zeolitic material, in which the solid is crystallized from at least one precursor compound and the reaction discharge of the crystallization is fed directly to a drying stage. Here, the term "directly" means that no removal of any components is effected between crystallization and drying, and preferably the product of the crystallization is fed to the drying stage without a further intermediate stage.

The novel drying is preferably effected by means of spray-drying or drying by means of fluidized-bed spray granulation, each of which may be carried out continuously or batchwise. The drying is dried while maintaining a temperature in the range of from 100 to 350° C., preferably from 100 to 250° C., while maintaining the safety conditions necessary in the process, until the free-flowing powder is obtained. The drying is preferably carried out in an atmosphere which comprises oxygen and at least one inert gas. This atmosphere is preferably circulated as a carrier gas stream. Conventional inert gases, such as, for example, nitrogen, carbon monoxide, carbon dioxide, helium and argon or mixtures of two or more thereof, may be used as the inert gas. The oxygen content of the atmosphere is preferably less than 10, more preferably less than 5, % by volume. Furthermore, a stack gas mixture having a COx content which ensures that there are no explosion problems may be used as inert gas, it being possible to obtain such a stack gas mixture by combustion of natural gas for stack gas production and it being possible simultaneously to generate energy for the energy-intensive stages of the process.

In the drying according to the invention, it is essential that the atmosphere be adjusted, in particular with respect to the oxygen content, so that the procedure is carried out safely outside the explosion limits.

If the crystallization described at the outset is carried out in the presence of a template compound, this template compound which may still be adhering to the crystalline solid as dry material can be removed in a downstream step by means of a preferably aqueous wash solution and can be recycled to the crystallization step. However, the main part of the template is removed during the drying of the reaction discharge, the condensable template compounds then present in the carrier gas stream being condensed out.

The present invention thus also relates to an integrated process for the preparation of a crystalline solid comprising at least one zeolitic material, in which (i) the solid is continuously crystallized from at least one precursor compound in the presence of at least one template compound, (ii) the reaction discharge from the crystallization is continuously spray-dried, no component of the reaction discharge of the crystallization being separated off before the drying, (iii) the drying is carried out in an atmosphere comprising oxygen, preferably less than 10% by volume of oxygen, and at least one inert gas, this atmosphere being circulated as a carrier gas stream, (iv) template compounds condensable from the carrier gas stream after contact of the stream with the reaction discharge to be dried are condensed out and are recycled to (i), (v) the spray-dried crystalline solid from (ii) is subjected to a continuous wash process in which template compounds which are included in the crystalline solid are separated off and recycled to (i), and (vi) the crystalline solid obtained from (v) is calcined, the energy released as a result of burning of the remaining amount of template compounds being fed back to (i).

In addition, additives which serve for binding the spray-dried material, i.e. imparting mechanical stability to said material, or for doping the spray-dried material with catalytically active components can of course also be added to the reaction discharge prior to drying, and the application of metals for the use of the resulting solid as an oxidation catalyst according to DE-A 44 25 672 should be mentioned here.

There are no restrictions at all with regard to the crystalline solids which are dried or prepared by the novel process and comprise at least one zeolitic material. The following zeolites may be mentioned individually.

Ti, Ge, Te, Ta, V, Cr, Nb and Zr zeolites and in particular Ti zeolites are preferably used.

These include specifically Ti, Ge, Te, Ta, V, Cr, Nb or Zr zeolites of the structure type ABW, ACO, AEI, AEL, AEN, AET, AFG, AFI, AFN, AFO, AFR, AFS, AFT, AFX, AFY, AHT, ANA, APC, APD, AST, ATN, ATO, ATS, ATT, ATV, AWO, AWW, BEA, BIK, BOG, BPH, BRE, CAN, CAS, CFI, CGF, CGS, CHA, CHI, CLO, CON, CZP, DAC, DDR, DFO, DFT, DOH, DON, EAB, EDI, EMT, EPI, ERI, ESV, EUO, FAU, FER, GIS, GME, GOO, HEU, IFR, ISV, ITE, JBW, KFI, LAU, LEV, LIO, LOS, LOV, LTA, LTL, LTN, MAZ, MEI, MEL, MEP, MER, MFI, MFS, MON, MOR, MSO, MTF, MTN, MTT, MTW, MWW, NAT, NES, NON, OFF, OSI, PAR, PAU, PHI, RHO, RON, RSN, RTE, RTH, RUT, SAO, SAT, SBE, SBS, SBT, SFF, SGT, SOD, STF, STI, STT, TER, THO, TON, TSC, VET, VFI, VNI, VSV, WEI, WEN, YUG, ZON and ITQ-4 or of a mixed structure comprising two or more of these structures or a mixture of two or more of these zeolites, where those having the MFI structure, BEA structure, MEL structure, ITQ-4 or MFI/MEL mixed structure in turn are to be regarded as particularly preferred. Zeolites of this type are described, for example, in the abovementioned publication by W. M. Meier et al.

Particularly preferred catalysts are specifically the Ti-containing zeolite catalysts, which are generally referred to as "TS-1", "TS-2", "TS-3", "ZSM-48" and "ZSM-12", in each case with Ti, TTM-1, Ti-RUT, Ti-MCM-35, titanium-containing zeolites of the type "UTD-1", "CIT-5", "CIT-1" and "SSZ-24" and Ti zeolites having a skeletal structure isomorphous with beta-zeolite.

For example, titanium zeolites as disclosed, for example, in U.S. Pat. No. 3,329,481 are used. In the case of such titanium zeolites, some of the Si(IV) originally present in the silicate lattice is replaced by titanium as Ti(IV).

Further titanium zeolites, in particular those having a crystal structure of the MFI type and possibilities for their preparation are described, inter alia, in U.S. Pat. No. 4,410,501, EP-A 0 311 983, U.S. Pat. No. 4,666,692, DE-A 3 047 798 or BE 1 001 038, the content of which in this respect is hereby fully incorporated by reference in the context of the present application. Further titanium-containing zeolites which can be readily used in the present invention and have a structure differing from the MFI structure are described, for example, in EP-A 0 405 978. In addition to silicon and titanium, such zeolites may also contain additional elements, such as aluminium (as described, inter alia, in DE-A 31 41 283), gallium (EP-A 0 266 825), boron (U.S. Pat. No. 4,666,692) or small amounts of fluorine (EP-A 0 292 363). Regarding the zeolites described there, the content of the applications described above is also hereby fully incorporated by reference in the context of the present application.

Further zeolite catalysts which can be used in the process of the present invention are described, inter alia, in U.S. Pat. No. 5,430,000 and WO 94/29408, the content of which in this context is hereby incorporated by reference in the present application.

Examples of further titanium-containing zeolites are those having the structure of ferrierite or β-zeolite or of mordenite.

Furthermore, the following zeolite catalysts may be used in the novel process:

Catalysts having a zeolite structure, as are described in DE-A 196 23 611.8, which is hereby fully incorporated by reference, with respect to the catalysts described therein, in the context of the present application.

These are oxidation catalysts based on titanium silicates or vanadium silicates having a zeolite structure, reference being made to the structures stated above as being preferred with regard to the zeolite structure. These catalysts are characterized in that they are formed, as described in detail in the above application, by shaping processes which impart strength.

Furthermore, oxidation catalysts based on titanium silicates or vanadium silicates having a zeolite structure and containing from 0.01 to 30% by weight of one or more noble metals from the group consisting of ruthenium, rhodium, palladium, osmium, iridium, platinum, rhenium, gold and silver, which are likewise characterized in that they have been formed by shaping processes which impart strength, may be used. Such catalysts are described in DE-A 196 23 609.6, which is hereby fully incorporated by reference, with respect to the catalysts described therein, in the context of the present application.

Regarding the shaping processes which impart strength, the binders and the assistants and the structure of the oxidation catalysts, reference may be made to DE-A 196 23 611.8.

The oxidation catalyst described in DE-A 196 23 609.6 contains from 0.01 to 30, in particular from 0.05 to 15, especially from 0.1 to 8, % by weight, based in each case on the amount of the titanium or vanadium zeolites, of said noble metals. Here, palladium is particularly preferred. The noble metals can be applied to the catalyst in the form of suitable noble metal components, for example in the form of water-soluble salts, before, during or after the shaping step which imparts strength.

Furthermore, the following catalysts can be used according to the invention:

A molding containing at least one porous oxidic material and obtainable by a process which comprises the following stages:
(I) addition of a mixture containing at least one alcohol and water to a mixture containing a porous oxidic material or a mixture of two or more thereof, and
(II) kneading, molding, drying and calcining the mixture added according to stage (I).

Details of this catalyst are to be found in DE-A 197 23 751.7, which is hereby fully incorporated by reference in the context of the present application.

According to the invention, it is furthermore possible to use silica-containing solids which can be prepared by a process which comprises the following stage (I):
(I) bringing at least one precursor of silica into contact with at least one structure former in a liquid medium, characterized in that the structure former is a polyethyleneimine or a mixture of two or more thereof.

Details of this solid are to be found in DE-A 197 32 865.2, the context of which in this respect is hereby fully incorporated by reference into the present application.

Further readily usable catalysts are moldings which comprise an inert support and, applied thereon, at least one silicate, preferably a crystalline silicate, obtainable by applying a mixture containing at least one silicate and at least one metal acid ester or a hydrolysis product thereof or a combination of metal acid ester and hydrolysis product thereof to an inert support, as described in DE-A 197 54 924.1, the content of this application in this respect likewise being hereby incorporated by reference into the present application.

According to the invention, it is furthermore possible to use moldings comprising at least one silicate and at least one metal oxide, preparable by a process which comprises the following stage (i):
(i) mixing of the at least one silicate with at least one metal oxide sol which has a low content of alkali metal and alkaline earth metal ions,
as described in DE-A 198 15 879.3.

The content of this application in this respect is hereby likewise incorporated by reference in the context of the present application.

According to the invention, it is furthermore possible to use titanium silicalites having an RUT structure, preparable by a process which comprises the steps (i) and (ii):

(i) preparation of a mixture of at least one $SiO_2$ source and at least one titanium source;
(ii) crystallization of the mixture from (i) in a pressure-resistant container with addition of at least one template compound, a suspension being obtained, characterized in that amines or ammonium salts which are suitable for stabilizing cages of the silicate structure [445462] and [44566581] are used as the template compound.

Details of these catalysts are to be found in DE-A 198 39 792.5.

According to the invention, it is moreover possible to use the silicas described in DE-A 198 47 630.2 having mesopores and micropores, which silicas preferably have one or more of the following features (i) to (iii):
(i) a sum of the specific surface areas of the mesopores and micropores of at least 200 m2/g;
(ii) a sun of the pore volumes of the mesopores and micropores of at least 0.2 ml/g;
(iii) a maximum of the diameter distribution of the mesopores at at least 3 nm.

Further details of these catalysts are to be found in the abovementioned application, the context of which in this respect is hereby fully incorporated by reference into the present application.

As stated at the outset, the zeolite-containing crystalline solids prepared by the novel process can be used in a conventional manner as catalysts, support materials for catalysts, sorbents, as a pigment or as a filler for plastics, the use for the preparation of alkylene oxides starting from alkenes with the use of a hydroperoxide, in particular for the preparation of propylene oxide by reacting propene with $H_2O_2$, being mentioned in particular.

The present invention is to be illustrated with reference to an example.

EXAMPLE 11.98 kg of tetraethoxysilane, 240 g of tetraethyl orthotitanate and a mixture of 7.06 kg of tetrapropylammonium hydroxide (40% by weight in water) in 10.54 kg of demineralized water were mixed in a stirrable steel pressure-resistant container and homogenized for one hour at room temperature. The alcohol formed was distilled off, the residue was made up to 18.1 kg of water and crystallization was effected in the course of 24 hours at 175° C. while stirring.

The crystallization product was transferred without further separation or purification steps, via a pipeline, into a spray dryer (from Niro) and was sprayed at a rate of 3 l/h via a nozzle. The inlet temperature was 230° C., with an outlet temperature of from 110 to 120° C. The carrier gas used was nitrogen with 2% by volume of oxygen. The amount of drying gas was 70 m3(S.T.P.)/h, the drying gas being preheated to 110° C. by means of the exit gas.

The yield of $SiO_2$ in the titanium zeolite over the integrated steps of the crystallization and spray drying was 94%, based on $SiO_2$ used.

We claim:
1. A process for the preparation of a crystalline solid comprising at least one zeolitic material, in which the solid is crystallized from at least one precursor compound and the reaction discharge of the crystallization is fed directly to a drying stage, drying being carried out in an atmosphere comprising less than 10% by volume of oxygen and at least one inert gas,
   characterized in that said crystallization is carried out in the presence of at least one template compound, and
   characterized in that, after contact with the atmosphere in the form of a carrier gas stream with the reaction discharge to be dried, condensable template compounds present in the stream are condensed out.

2. The process as claimed in claim 1, characterized in that said drying is spray-drying.

3. A process as claimed in claim 1, characterized in that template compounds which are included in the dried crystalline solid are separated from the solid by means of at least one wash process.

4. An integrated process for the preparation of a crystalline solid comprising at least one zeolitic material, in which (i) the solid is continuously crystallized from at least one precursor compound in the presence of at least one template compound, (ii) the reaction discharge from the crystallization is continuously spray-dried, no component of the reaction discharge of the crystallization being separated off before the drying, (iii) the drying is carried out in an atmosphere comprising oxygen, preferably less than 10% by volume of oxygen, and at least one inert gas, this atmosphere being circulated as a carrier gas stream, (iv) template compounds condensable from the carrier gas stream after contact of the stream with the reaction discharge to be dried are condensed out and are recycled to (i), (v) the spray-dried crystalline solid from (ii) is subjected to a continuous wash process in which template compounds which are included in the crystalline solid are separated off and recycled to (i), and (vi) the crystalline solid obtained from (v) is calcined, the energy released as a result of burning of the remaining amount of template compounds being fed back to (i).

5. The process as claimed in claim 2, characterized in that template compounds which are included in the dried crystalline solid are separated from the solid by means of at least one wash process.

* * * * *